Patented Oct. 7, 1941

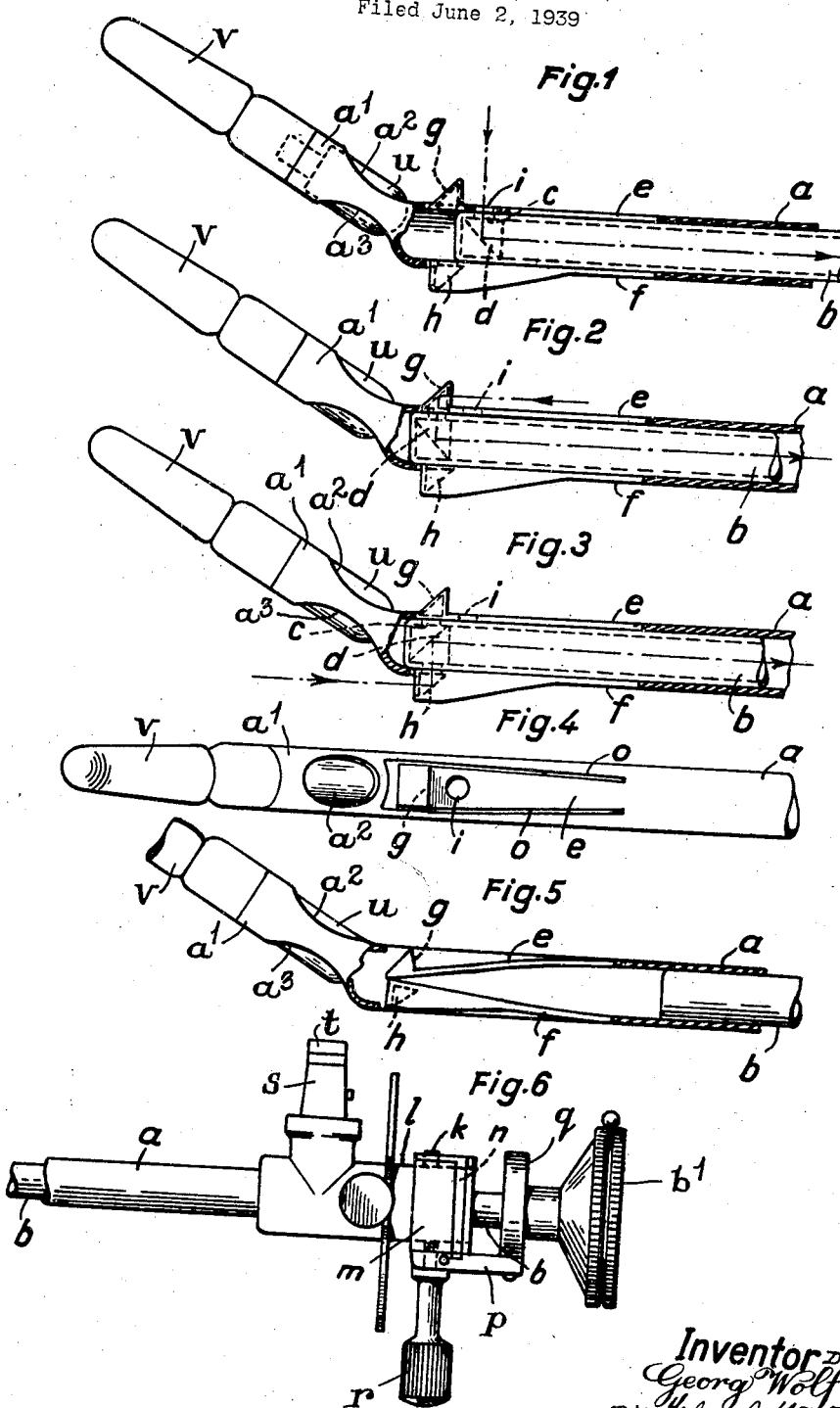

2,258,083

UNITED STATES PATENT OFFICE 2,258,083

INSTRUMENT FOR EXAMINING BODY CAVITIES

Georg Wolf, deceased, late of Berlin, Germany, by Elisabeth Wolf, Berlin-Hessenwinkel, Richard Wolf, Berlin, Georg Wolf, Berlin-Hessenwinkel, and Margarete Ladwig, née Wolf, Berlin-Alexanderhof, Germany, as heirs, assignors to the firm of Georg Wolf G. m. b. H., Berlin, Germany Application June 2, 1939, Serial No. 277,120 In Germany June 10, 1938

3 Claims. (Cl. 128—8)

An application has been filed in Germany, June 10, 1938.

In the examination of body cavities, especially the stomach, it is of much importance to have a wide field of view at disposal. The invention meets this requirement to a very great extent in an instrument for the examination of body cavities having a periscope tube which is introducible into a guide tube and in which a reflecting surface disposed on its forward end deviates the optical axis approximately at right angles, by providing on the forward end of the guide tube two reflecting surfaces diametrically opposite to each other and permitting respectively a retrograde and a prograde view when the periscope tube assumes the position necessary in each case. In an instrument thus constructed it is only necessary to rotate the optical tube about its axis in order to place at option the one or the other reflecting system of the guide tube into the ray path, so that the vision is either forward or backward. The periscope tube alone, i. e. without one of the reflecting surfaces on the guide tube being placed into the ray path, permits after a slight change in position, for instance an axial displacement, the normal view at right angles to the axis, so that an instrument according to the invention offers views in three different directions.

The bodies containing the reflecting surfaces of the guide tube, for instance prisms, are conveniently fixed to resilient carriers which are arranged in such a manner that they lie conjointly with the reflectors in the interior of the guide tube as long as this interior space is not occupied by the periscope tube, which urges them out when being pushed forward. The instrument is, accordingly, smooth outside when being inserted into and withdrawn from the body cavity.

One of the resilient parts carrying the reflectors for prograde and retrograde vision has conveniently an aperture through which the imaging rays leave the instrument in the ordinary vision at right angles to the axis of the periscope tube.

In the accompanying drawing, which illustrates a constructional example of the invention, Figures 1 to 3 show in part-sectional elevation the forward part of a gastroscope, the periscope tube assuming in Fig. 1 the position for normal, in Fig. 2 the position for retrograde and in Fig. 3 the position for prograde vision, Figure 4 is a top view of the forward part of the instrument, Figure 5 shows a part-sectional elevation of the forward part of the instrument, the periscope tube being withdrawn, and Figure 6 shows a side view of the eye-piece end of the instrument.

Into the guide tube of the instrument, which is designated $a$, can be introduced a periscope tube designated $b$, having an eye shell $b^1$ (Fig. 6). Beneath the light entrance aperture $c$ of the tube $b$ is disposed a prism $d$. For normal vision, the aperture $c$ lies below a viewing aperture $i$ (Fig. 1). The guide tube $a$ is slitted at $o$ (Fig. 4) in such a manner that a resilient tongue $e$ is formed. The extremity of this tongue $e$ carries a prism $g$ which is so disposed that light rays coming from the rear are deviated into the interior. Diametrically opposite the tongue $e$, the wall of the guide tube $a$ is slitted in the same manner, so that a resilient tongue $f$ is formed, which carries a prism $h$ arranged in such a way as to deviate into the interior of the instrument the rays coming from in front. The tube $a$ is provided with a part $a^1$ having two openings $a^2$ and $a^3$ and carrying a glow lamp $u$. To the forward end of the part $a^1$ is adjoined a piece $v$ of rubber.

If, accordingly, the periscope tube $b$ is displaced from the position shown in Fig. 1 to below the prism $g$, the observer's eye receives the light rays coming from the rear, and when the periscope tube is rotated in this position through 180° the observer's eye receives the light rays coming from in front, as is indicated by arrows in the Figures 2 and 3.

For introducing the instrument into the body cavity and removing it therefrom, the periscope tube is to be withdrawn. The prisms $g$ and $h$ assume in this case the positions shown in Fig. 5, because the springs $e$ and $f$, which are of the resilient material of the guide tube $a$, have a corresponding initial tension.

To ensure for the forward part of the periscope tube the position required in each particular case, the rearward end of the guide tube has on a cylindrical attachment piece $l$ (Fig. 6) a pin $k$ which lies in a bayonet groove $n$ of a part $m$ connected to the periscope tube $b$ through a bridge $p$. This bridge $p$ is fixed on a disc-like part $q$ of the periscope $b$ and is clamped on the part $m$ with a screw $r$. The piece $l$ further carries a plug $s$ with a contact $t$ being insulated from the plug $s$ and in connection with one pole of the lamp $u$. The other pole of the lamp $u$ is connected to the tube $a$. In the position shown in Fig. 6, the aperture $c$ lies below the aperture $i$. When the periscope tube is inserted so far into the guide tube $a$ that the pin $k$ lies against the other end of the groove, the parts assume the positions shown in Fig. 2. If the periscope tube is now rotated anti-clockwise through 180°, the position shown in Fig. 3 is arrived at.

The viewing aperture $i$ and the prisms $g$ and $h$ can eventually lie in a common plane at right angles to the axis of the periscope tube, so that a rotation of the periscope tube through 90° from the position for retrograde vision results in the position for normal vision and another rotation through 90° results in the position for prograde vision.

The resilient carriers $e$ and $f$ of the prisms $g$ and $h$ can be as well self-contained elastic parts connected to the guide tube $a$ for instance by soldering.

It is claimed:

1. In an instrument for viewing body cavities, especially the stomach, a guide tube, a periscope tube displaceable and rotatable in said guide tube, a mirror disposed on the forward end of said periscope tube, said mirror and the axis of said periscope tube including an angle of approximately 45°, said mirror permitting a view at approximately right angles to the axis of said periscope tube, two mirrors disposed diametrically opposite to each other on the forward part of said guide tube and permitting respectively a retrograde and a prograde vision through said periscope tube when said periscope tube assumes the respective positions.

2. In an instrument for viewing body cavities, especially the stomach, a guide tube, a periscope tube displaceable and rotatable in said guide tube, a mirror disposed on the forward end of said periscope tube, said mirror and the axis of said periscope tube including an angle of approximately 45°, said mirror permitting a view at approximately right angles to the axis of said periscope tube, two mirrors and two resilient carriers for said mirrors, said carriers being diametrically opposite to each other on the forward part of said guide tube and having a tension urging said mirrors into the interior of said guide tube.

3. In an instrument for viewing body cavities, especially the stomach, a guide tube, a periscope tube displaceable and rotatable in said guide tube, a mirror disposed on the forward end of said periscope tube, said mirror and the axis of said periscope tube including an angle of approximately 45°, said mirror permitting a view at approximately right angles to the axis of said periscope tube, two mirrors and two resilient carriers for said mirrors, said carriers being diametrically opposite to each other on the forward part of said guide tube and having a tension urging said mirrors into the interior of said guide tube, one of said carriers having an aperture for sideward vision through said periscope tube.

ELISABETH WOLF,
RICHARD WOLF,
GEORG WOLF,
MARGARETE LADWIG NÉE WOLF,
*The Heirs to the Estate of Georg Wolf, Deceased.*